Figure 5:
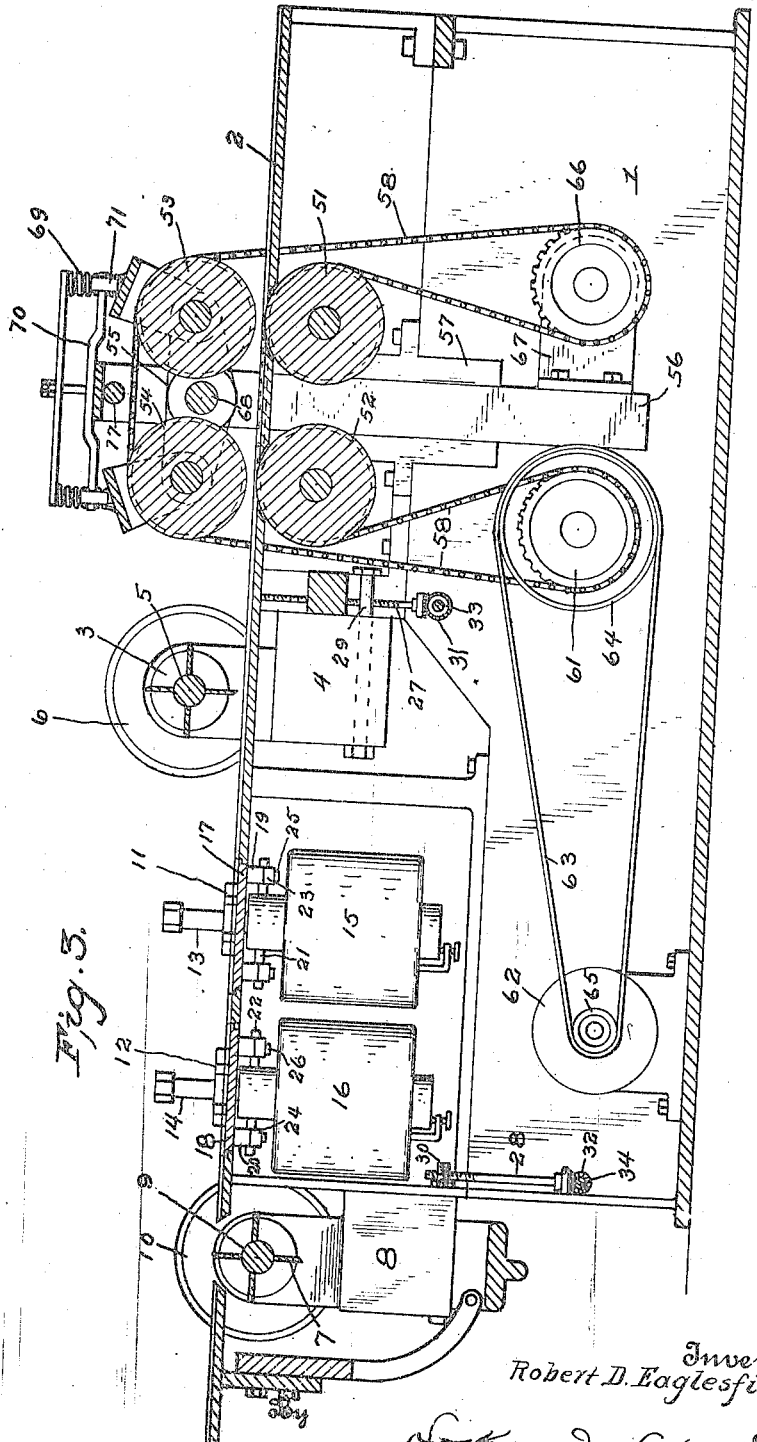

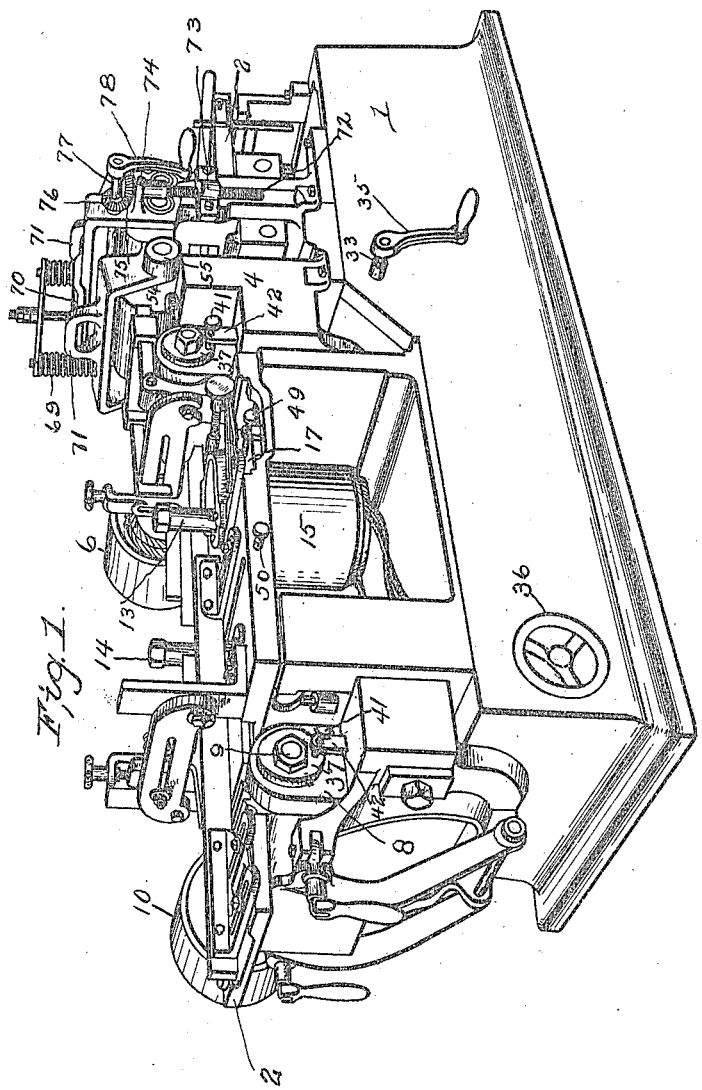

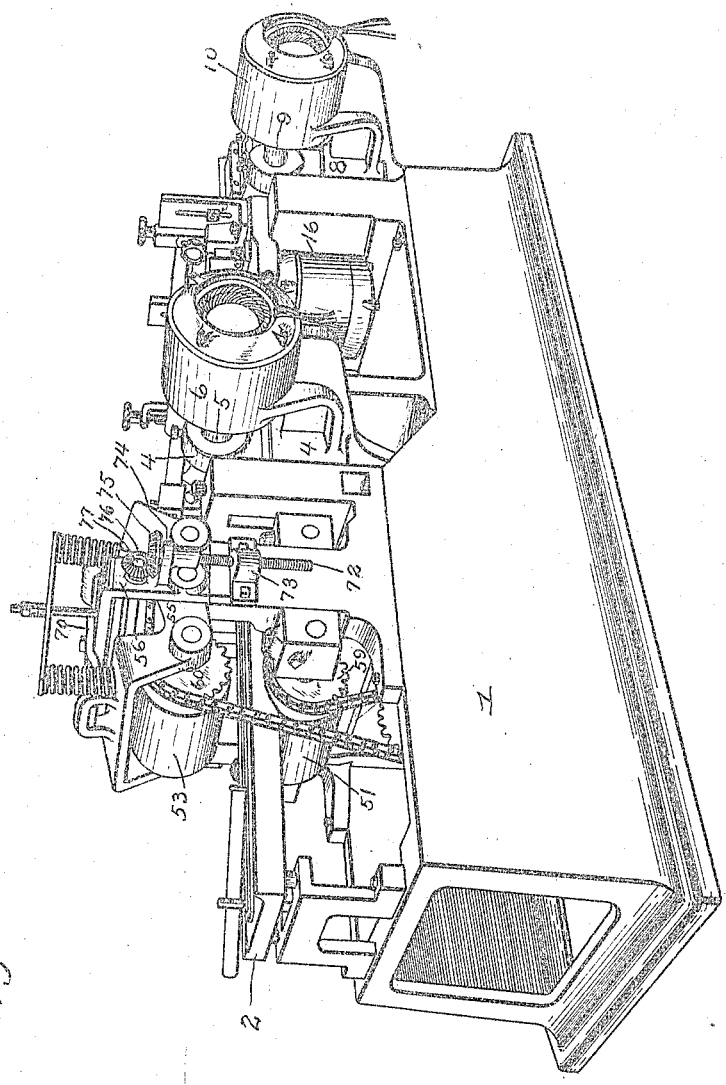

R. D. EAGLESFIELD.
MOLDING MACHINE.
APPLICATION FILED SEPT. 10, 1917.

1,264,165.

Patented Apr. 30, 1918.
4 SHEETS—SHEET 3.

Inventor
Robert D. Eaglesfield
By Lockwood & Lockwood
Attorneys

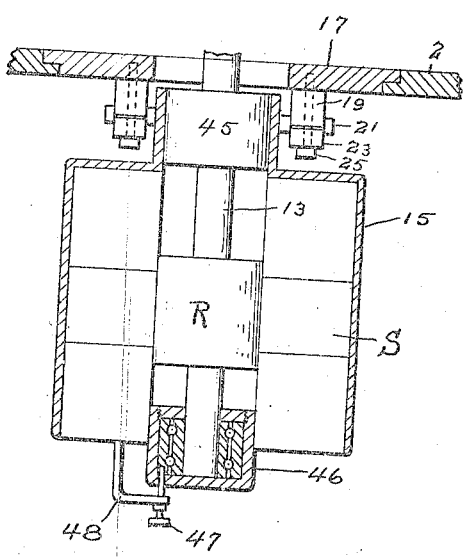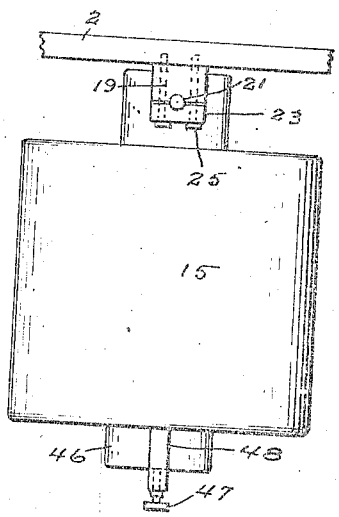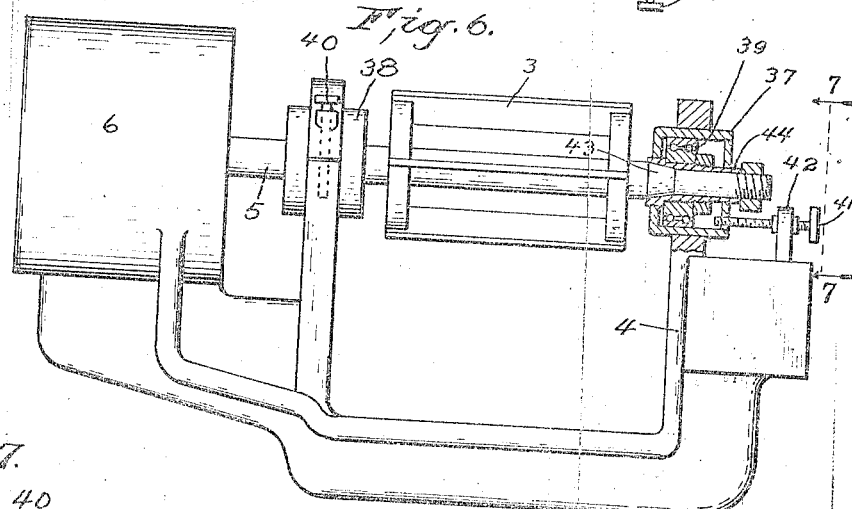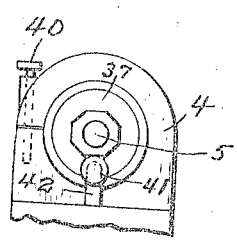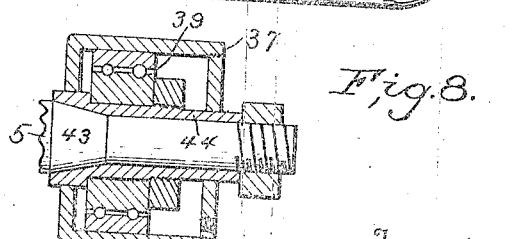

UNITED STATES PATENT OFFICE.

ROBERT D. EAGLESFIELD, OF INDIANAPOLIS, INDIANA.

MOLDING-MACHINE.

1,264,165.

Specification of Letters Patent.  Patented Apr. 30, 1918.

Application filed September 10, 1917. Serial No. 190,579.

*To all whom it may concern:*

Be it known that I, ROBERT D. EAGLESFIELD, a citizen of the United States, and a resident of Indianapolis, county of Marion, and State of Indiana, have invented a certain new and useful Molding-Machine; and I do hereby declare that the following is a full, clear, and exact description thereof, reference being had to the accompanying drawings, in which like letters refer to like parts.

My invention relates to new and useful improvements in molding machines and my prime object is to provide individually operated and driven cutter heads so arranged that all faces of the timber will be cut by passing the timber once through the machine. A further object is to provide means for longitudinally adjusting the various cutter heads without disturbing the driving mechanism for the cutter heads. A further object is to provide adjustable means for feeding the timber to the cutter heads. A futher object is to provide a chain drive for the feeding rolls and so arrange the same that a single chain will drive all of the rolls. A further object is to provide movable supports for certain of the cutter heads and their driving mechanisms, whereby the cutter heads may be adjusted with respect to the faces of the timber, and a further object is to provide means for supporting the cutter heads for cutting the side faces of the timber and the driving means therefor, at various angles so that the side faces of the timber may be beveled or formed into any desired shape.

Other objects and advantages will be hereinafter more fully set forth and pointed out in the accompanying drawings and the following description and claims.

Figure 1 is a perspective view of the molder showing the operating side thereof. Fig. 2 is perspective view of the opposite side of the molder. Fig. 3 is a vertical longitudinal sectional view through the molder. Fig. 4 is a central vertical sectional view through one of the vertical motors. Fig. 5 is a side elevation of one of the vertical motors from a point at right angles to the view shown in Fig. 4. Fig. 6 is an elevation of one of the horizontal cutter-heads and motors, and supporting means therefor, parts of said supporting means being in section. Fig. 7 is an elevation of the upper end of one of the supporting arms for the horizontal cutter-head as seen from line 7—7, Fig. 6, and Fig. 8 is an enlarged sectional view of one end of the horizontal cutter head shaft and its bearing, removed from its support.

Referring to the drawings in which similar reference numerals designate corresponding parts throughout the several views, 1 indicates the frame of the machine which may be constructed in any preferred manner, and 2 indicates a bed plate at the upper end of the frame over which the articles to be cut are passed.

The prime object of this invention is to provide cutting devices for planing all sides of the timber as its passes over the bed plate, and to perform the work simultaneously, each cutter-head being operated independently of the others by an individual motor. To this end, therefore, a horizontally disposed cutter-head 3 is mounted in a supporting frame 4 and so positioned that it will cut the upper face of the timber as it passes lengthwise of the bed plate, the shaft 5 carrying the cutter-head having a motor 6 attached to one end thereof.

A similar cutter-head 7 is mounted in a supporting frame 8 at a point adjacent the rear end of the bed plate and below said bed plate; this cutter-head being employed for cutting the lower face of the timber. The cutter-head 7 is likewise mounted upon a shaft 9, to one end of which is attached a driving motor 10.

Between the cutter-head 3 and the cutter-head 7 are vertically extending cutter-heads 11 and 12 which are adapted to cut the opposite side faces of the timber, the latter cutter-heads being mounted upon vertical shafts 13 and 14 respectively, to which are attached vertically disposed motors 15 and 16 respectively.

In order to adjust the cutter-heads 11 and 12, and their respective motors laterally, said motors are suspended from plates 17 and 18 respectively, which are slidably mounted in the bed plate 2, and movable transversely thereof. The plates 17 and 18, have depending arms 19 and 20 respectively, which are engaged by pins 21 and 22 on the casings of the motors 15 and 16. The arms 19 and 20 are preferably formed in two parts, the lower parts 23 and 24 being held in engagement with the upper or fixed parts of said arms by means of bolts 25 and 26, each part of the arm being provided with a semicircular seat through which the pins project, and as said seats are slightly less than semi-circular the motors will be held against swinging movement when the bolts 25 and 26 are properly turned home. This form of bearing also permits the motors and cutter-heads operated thereby to be secured at an angle to the timber so that the faces of the timber operated upon by said cutter-heads may be cut at any suitable angle.

The supporting frames 4 and 8 are vertically adjusted to carry the cutter-heads 3 and 7 toward or from the faces of the timber through the medium of adjusting screws 27 and 28 which are threaded through openings in clamping bolts 29 and 30 respectively, which bolts are projected through the supporting frames 4 and 8 and through slots in parts of the frame 1. The screws 27 and 28 are rotated through the medium of gears 31 and 32, shafts 33 and 34 and hand operating means 35 and 36, the latter being preferably positioned on the outside of the frame 1 so that ready access may be had thereto for raising and lowering the supporting frames. In adjusting the frames 4 and 8 the nuts on the bolts 29 and 30 are loosened, when the screws 27 and 28 are rotated and the frames adjusted to the desired position, the nuts again turned onto the bolts 29 and 30 and the frames securely clamped in their adjusted positions.

The shafts 5 and 9 of the cutter-heads 3 and 7 are extended through housings 37 and 38 in which are positioned ball bearings 39, the housings extending through the arms of the frames 4 and 8, and after the housings, and the cutter-heads carried thereby, are properly adjusted, said housings are clamped in position in the arms of the supporting frames in any preferred manner as by means of screws 40. The cutter heads and housings are adjusted longitudinally through the medium of adjusting screws 41 which project through standards 42 carried by supporting frames 4 and 8, this construction being best shown in Fig. 6.

In order to conveniently remove the cutter-heads 3 and 7 for grinding or changing the same, the ends of the shafts passing through the bearing housings 37 are reduced in size and provided with tapered shoulders 43, with which engage tapered portions of sleeves 44, said sleeves being fixed to parts of the ball bearings 39 in the housings 37 so that said sleeves can rotate with their respective shafts and will be held against longitudinal movement with the shaft independently of the housings. By this construction the shafts can be moved longitudinally through their respective bearings and motors until the cutter heads 3 and 7 are released, and without disturbing the housings 37 as they remain fixed in their respective parts of the supporting frames 4 and 8.

The cutter-heads 11 and 12, and their respective shafts 13 and 14, are likewise vertically adjusted independently of the motors, by mounting the shafts 13 and 14 in bearings 45 and 46 adjacent the upper and lower ends of said shafts, the housings 46 being moved vertically by means of adjusting screws 47 carried by arms 48 projecting from the motors. As the various shafts for the cutter heads carry the rotor irons R of the motors, and as said shafts are adjusted longitudinally independent of the motor, it is necessary to make said rotor irons "R" of a greater length than the width of the stator irons "S," or the stator irons of a greater width than the length of the rotor irons, so that at whatever position said shafts may be adjusted, the rotor irons "R" will be in engagement with the stator irons "S" the full width of the stator irons. The plates 17 and 18 are adjusted laterally in any desired manner as by means of screws 49 and 50, which screws project through parts of the bed plate 2 and engage the ends of plates 17 and 18 respectively.

The timber is moved longitudinally over the bed plate 2 and fed to the various cutter heads by means of feeding rolls 51, 52, 53 and 54, the rolls 51 and 52 being paired and positioned below the bed plate and the rolls 53 and 54 being paired and positioned above the bed plate, the rolls 53 and 54 being supported by a bracket 55 carried by standards 56, said standards being vertically movable through guides 57. The feeding rolls are rotated through the medium of the sprocket chain 58 which passes over sprocket gears 59 and 60 which are attached to the lower and upper pairs of rolls, said sprocket chain also passing around a sprocket gear 61 which latter gear is rotated from a motor 62 through the medium of a belt 63 and pulleys 64 and 65 attached to the gear and motor respectively. As the upper pair of rolls move vertically to accommodate timbers of varying thickness or width, the sprocket chain 58 is disposed around an idle sprocket 66 carried by a bracket 67 on one of the standards 56, and with this construction it will be readily seen that the chain will be held taut at all times.

As it is necessary for the upper pair of rolls to adjust itself to any uneven surfaces of the timber, the brackets 55 are mounted upon a shaft 68 which extends transversely over the planer so that said bracket and the rolls carried thereby may have rocking motion. The brackets 55 are held substantially in rigid position by means of compression springs 69 and the cross head 70 carried by the movable standards 56, parts of the brackets 55 having stirrups 71 through which the ends of the cross head 70 extend. The upper pair of rolls are vertically adjusted through the medium of screws 72 which are threaded through projection 73 on the frame 1 and through a bearing 74 on the standards 56, the upper ends of the screws having gears 75 which mesh with gears 76 carried by a shaft 77, said shaft extending transversely across the top of the planer above the pair of adjustable rolls, said shaft having a crank 78 attached thereto for rotating the same, whereby both sides of the standards will be adjusted uniformly.

In operation a piece of timber is placed upon the bed plate 2 and entered between the pairs of upper and lower rolls, and it is then fed by said rolls below the cutter-head 3 which planes the upper surface of the timber, then between the cutter heads 11 and 12 which plane the side faces of the timber, and over the cutter-head 7 which planes the lower face of the timber, thereby completing the planing operation by passing the timber once through the machine. If it is desired to shape the side faces of the timber in any manner, the motors 15 and 16 are set at the proper inclination before the timber is entered between the cutter-heads 11 and 12. By providing an individual motor for each of the cutter-heads the operation of the planer is not only simplified but the action of one cutter-head is not influenced by the action of the other cutter-heads.

The invention claimed is:

1. In a molding machine, a cutter head, a shaft for said cutter head, a driving motor for said shaft, housings through which said shaft extends, means to move one of the housings and shafts lengthwise and move the shaft through the motor and other housing, and means to lock the housings against movement.

2. In a molding machine, a cutter head, a shaft for said cutter head, a driving motor for said shaft, and means to adjust said shaft longitudinally without affecting the position of the driving motor, comprising a stationary arm and an adjusting screw extending through said arm and into engagement with the parts carrying the shaft, whereby when the screw is moved lengthwise the shaft will be likewise adjusted longitudinally.

3. In a molding machine, a cutter head, a shaft for said cutter head, a motor attached to one end of said shaft, and means for adjusting said shaft and cutter head longitudinally without affecting the position of said motor, or changing the speed thereof.

4. In a molding machine, a shaft, a cutter head carried by the shaft, an operating motor on said shaft, a movable plate for supporting said motor, means to adjust said plate laterally, means for adjustably suspending said motor from said plate, and means to adjust said shaft longitudinally without affecting the position of said motor or changing the speed thereof.

5. In a molding machine, a cutter head, a shaft, a motor mounted upon said shaft, a stator iron for said motor, a rotor iron on said shaft, means for adjusting said shaft longitudinally, one of said irons being greater in length than the other, whereby said irons will always remain in full contact with each other coincident to the longitudinal adjustment of the shaft, and not change the speed of said motor when the shaft is adjusted.

In witness whereof, I have hereunto affixed my signature.

ROBERT D. EAGLESFIELD.